(No Model.)
B. SPITZNAGLE.
ANIMAL TRAP.
No. 426,873. Patented Apr. 29, 1890.
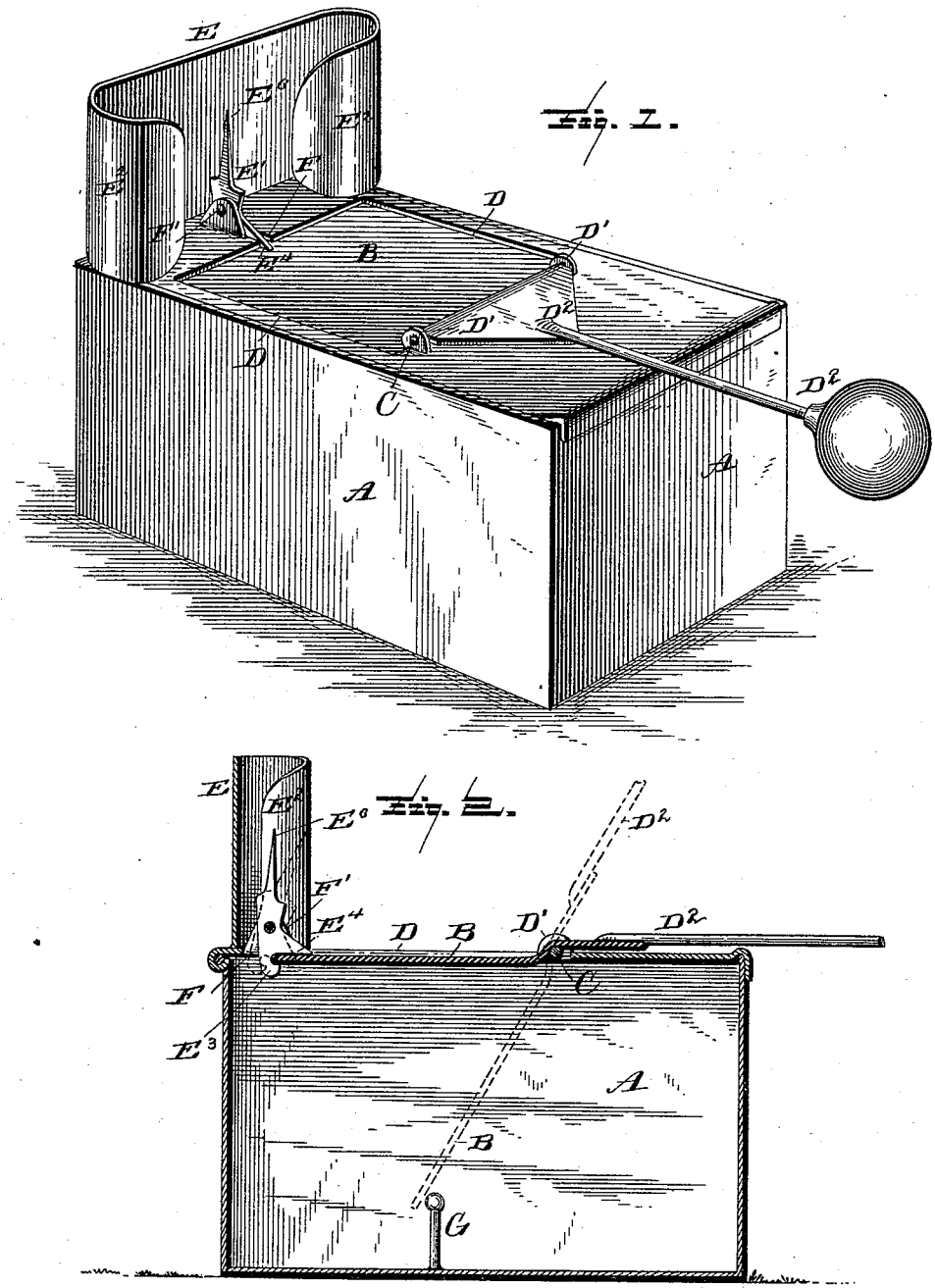
Witnesses
L. C. Hills.
D. T. Lauck.
Inventor
Benson Spitznagle
By his Attorney
Franklin H. Hough

UNITED STATES PATENT OFFICE.

BENSON SPITZNAGLE, OF MORRILL, KANSAS.

ANIMAL-TRAP.

SPECIFICATION forming part of Letters Patent No. 426,873, dated April 29, 1890.

Application filed February 24, 1890. Serial No. 341,476. (No model.)

*To all whom it may concern:*

Be it known that I, BENSON SPITZNAGLE, a citizen of the United States, residing at Morrill, in the county of Brown and State of Kansas, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in animal-traps; and it relates more especially to that class of traps which are intended for use in catching rats and mice.

The invention has for its object to improve upon the construction of that class of traps in which a chamber is provided for the reception of the animals in connection with a tilting platform adapted to be operated by the weight of the animal, and which when relieved of the weight will automatically return to its normal position, thus resetting the trap.

To this end and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1 is a perspective view of a trap constructed in accordance with my invention. Fig. 2 is a central longitudinal vertical section of the same, showing the platform as tilted in dotted lines.

Reference now being had to the details of the drawings by letter, A designates the body of the trap, which is preferably made of sheet metal and may be of any desired size or form, though in the present instance I have shown a substantially square or rectangular box.

B is the tilting platform, which is pivoted upon the transverse shaft or rod C, which rod extends across the opening D in the top plate of the box A at the rear edge of the said opening, the ends of the rod being suitably journaled within the ears D'. At its rear end the platform B is provided with a weighted extension $D^2$, which will serve to retain the platform in a horizontal position normally; but the weight of the extension $D^2$ should be so adjusted as to cause the platform to be tilted upon the application of a very slight weight to the upper face of the platform.

E is an upright or extension of sheet metal, which is soldered or otherwise secured to the upper face of the body of the trap at the end of the opening D opposite to that which is provided with the rod C. This upright is made of a single strip of sheet metal, and is soldered at its lower edge to the upper face of the box, and is extended transversely across the same, the ends of the strip being curved inwardly, as shown at $E^2$.

$E^5$ is the trigger or latch, which serves to prevent the platform from being tilted by the weight of the animal until the bait which is attached to the upper arm of the trigger is disturbed. This trigger consists of a piece of sheet metal, which is provided at its lower end with a hook $E^3$, adapted to engage the lower edge of the cover, and with a lug or projection $E^4$, which extends downwardly at an angle from the body of the strip, and when the platform is in its normal or horizontal position bears upon the upper face of the platform adjacent to its outer end. The upper end of the trigger is sharpened, as shown at $E^6$, thus providing a spit upon which the bait is attached. The trigger is pivoted within a longitudinal slit F, formed in the upper face of the top plate of the body of the trap within the space intervening between the curved ends $E^2$ of the upright E upon a pivot passed through the vertical ears F', which rise upon either side of said slit.

The operation of the trap is simple, and is as follows: The platform being in a horizontal position and retained in place by reason of the engagement of the hook $E^3$ beneath the lower edge of the end of the platform and bait having been placed upon the arm $E^6$, we will suppose that an animal ventures upon the platform and approaches the bait. The moment that a slight movement is given the trigger the hooked lower end $E^3$ will be thrown from its engagement with the platform, which, being thus deprived of its support, tilts downward, throwing the animal upon the platform into the chamber beneath. The stop G serves to prevent the platform from being thrown past a vertical position, and the weight of the animal having been removed from the platform it by the counter-weight or extension $D^2$ is caused to automatically return to a horizontal position, where the hooked end of the trigger at once engages and holds it until the trigger has again been disturbed.

The position and form of the standard or upright E, having its ends curved inwardly, as shown, serves to prevent the animal from reaching the bait either from the rear or from the sides, and thus compels it to step upon the platform in order to reach the bait.

The cover of the trap is hinged to the body of the trap, and the animals caught are removed by simply raising the cover, as will be understood.

Having thus described my invention, what I claim to be new, and desire to secure by Letters Patent, is—

1. The combination, with the body having an opening in its upper face, the pivoted platform to said opening, and the trigger engaging the end of said platform, of the sheet-metal guard E upon the top of the trap at one end thereof and extended transversely across the same, with the ends of the guard curved inwardly upon opposite sides of the trigger, with an opening between said ends, substantially as and for the purpose specified.

2. The herein-described improvement in animal-traps, the same comprising, in combination, the trap-body having an opening in its upper face, a platform pivoted at one of its ends to one edge of the opening, a rod secured at one of its ends to the pivoted end of the platform and carrying at its free end a weight adapted to normally close the platform over the opening, the upright E, secured to the upper face of the body of the trap at the end of the opening opposite that at which the platform is pivoted, the ends of the upright being turned inwardly, as described, the trigger pivotally connected with the upper face of the trap between the curved ends of the upright, said trigger being provided with a hook $E^3$, adapted to engage the end of the platform, and having an arm $E^6$ to receive the bait, substantially as shown and described, and for the purpose specified.

In testimony whereof I affix my signature in presence of two witnesses.

BENSON SPITZNAGLE.

Witnesses:
M. W. MEYERS,
P. K. FISHER.